Sept. 24, 1935.  W. F. EAMES  2,015,594
MOTOR CONTROL SYSTEM
Filed Feb. 15, 1930

INVENTOR
William F. Eames
BY
ATTORNEY

Patented Sept. 24, 1935

2,015,594

UNITED STATES PATENT OFFICE 2,015,594

MOTOR CONTROL SYSTEM

William F. Eames, Edgewood, Pa., assignor to Westinghouse Electric & Manufacturing Company, a corporation of Pennsylvania Application February 15, 1930, Serial No. 428,648

5 Claims. (Cl. 172—239)

My invention relates to motor control systems and has particular relation to motor control systems of the variable voltage type, in which the motor armature is connected in a closed circuit with the armature of a variable voltage generator, the speed of the motor being determined by the generator excitation, and the direction of motor rotation being determined by suitable reversing switches in any desirable circuit of the system, preferably in the generator field circuit.

In such systems, as ordinarily constructed, the generator is separately excited and the motor is accelerated by short circuiting sections of resistance in the generator separately excited field circuit; the time constant of the generator separately excited field circuit being relied upon to determine the rate of increase or decrease of the generator voltage and consequently of the motor speed. While for many purposes such systems are reliable and satisfactory, they are not entirely suitable for applications which require uniform motor acceleration and close speed regulation, such as elevator systems. The permissible number of sections of resistance in the generator field circuit is ordinarily limited by practical considerations, so that in systems as ordinarily built, each section of resistance represents a considerable percentage of the full motor speed.

In such a system, when a section of resistance is short circuited, the generator excitation does not increase at a uniform rate, but increases abruptly at first, the rate of increase falling off as the generator field builds up. In order to follow the initial abrupt change of the generator excitation, the motor must accelerate its load at a corresponding rate, drawing a correspondingly heavy current which gradually drops off as the motor comes up to speed. During the acceleration period, as the sections of resistance are successively short circuited, the motor current, motor torque and motor acceleration, therefore, fluctuate considerably, increasing after the short circuiting of each section of resistance then gradually decreasing until the next section of resistance is short-circuited.

The motor speed regulation of such a system is inherently poor, due to the resistance drop in the armatures of the generator and motor and in the conductors connecting them, and also due to the speed regulation of the generator driving means. If the generator is provided with a cumulative series field winding of sufficient number of turns to maintain the motor speed constant regardless of the load, the motor speed tends to follow the changes of generator excitation more closely, so that variations of motor current, motor torque and motor acceleration as the motor speeds up are more pronounced. In an elevator system, the variations of acceleration are noticeable and objectionable to the passengers.

In a variable voltage system with a compounded generator, as described above, the compounding of the generator, if correct for certain operating conditions, does not remain correct for other conditions reached during normal operation. The resistance of the common circuit of the generator and motor armatures varies because of variations of brush pressure, and wear on the brushes and variations of armature temperature. Each change of resistance affects the behavior of the motor under load.

An exciter for supplying the direct current used in the field windings and control system is commonly mounted on the generator shaft. When the system is started up after a period of inaction, the voltage of the exciter is ordinarily considerably higher than it is after the exciter has reached its normal working temperature. For example, the voltage of a 240 volt exciter, when cold may be about 265 volts, this voltage falling off to about 240 volts as the machine heats up. This variation of exciter voltage affects the excitation of the generator and motor and thus introduces a considerable disturbance into the system in starting.

During the period of motor acceleration in such a system, the time constant of the generator field circuit does not remain at a fixed value, but changes with each change of resistance in the generator field circuit. Consequently, if the average rate of change of generator excitation is of a desirable value during a particular interval in the acceleration period, it does not remain at this desirable value during other intervals when the resistance of the generator field circuit is of a different value.

The time constant of the generator field circuit can only be altered within certain limits determined by the design of the generator and the voltages available for the generator field circuit so that adjustment of the motor acceleration characteristics to suit the requirements of a particular application cannot always be carried to as fine a degree as desirable.

It is accordingly an object of my invention to provide a variable voltage motor control system, in which the acceleration and deceleration of the motor may be controlled independently of the time constant of the generator separately excited field.

Another object of my invention is to provide a variable voltage motor control system in which the acceleration and deceleration of the motor may be effected in a smooth and uniform manner and in which the period of acceleration and deceleration may be adjusted over a wide range.

Another object of my invention is to provide a variable voltage motor control system in which means are provided for maintaining the motor speed constant, independent of variations of load, and in which the motor speed regulation is independent of changes in resistance of the generator and motor armature circuit.

Another object of my invention is to provide a variable voltage motor control system in which the field windings of the motor and generator are energized from an exciter, and in which means are provided for preventing variations of the exciter voltage from affecting the motor speed.

According to my invention, I control the speed of the main motor in accordance with the difference in angular position of an auxiliary motor accelerated smoothly at an adjustable rate, and a telemotor element, driven at a speed proportional to the speed of the main motor.

Other objects of my invention will become evident from the following detailed description taken in conjunction with the accompanying drawing in which.

Figures 1, 2:
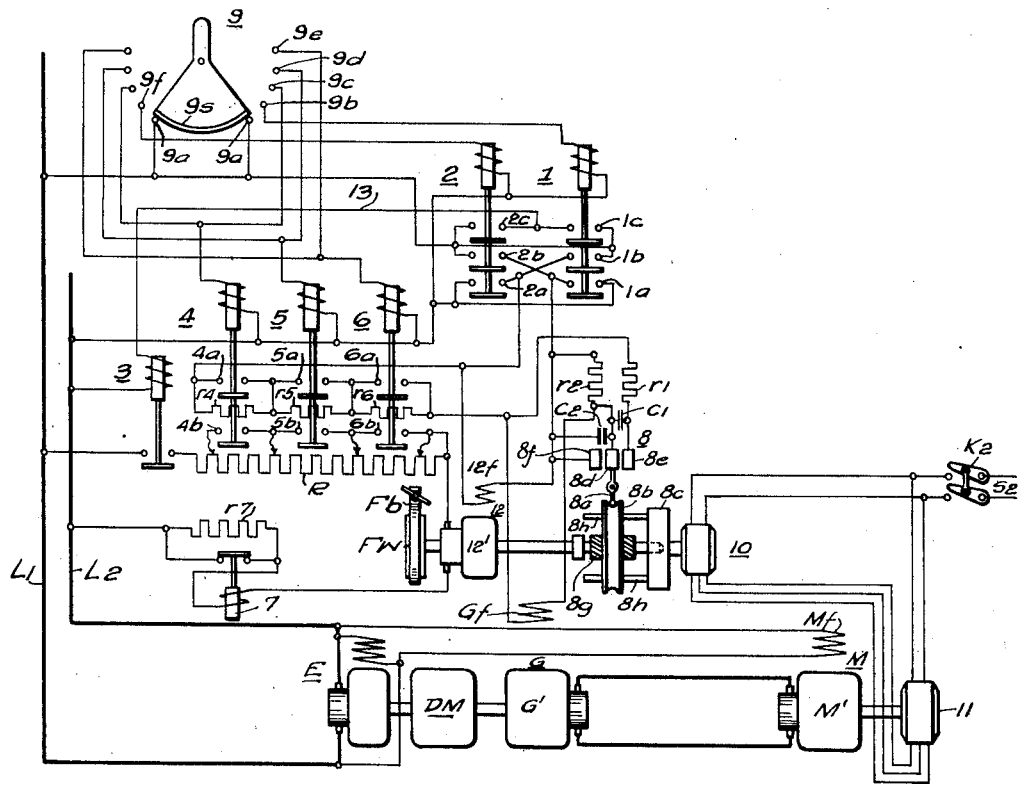
Figure 1 is a diagrammatic view of a system of control organized in accordance with the present invention.
Fig. 2 is a diagrammatic view of a differentially operated rheostat which I may substitute for the differential switch 8 of the system shown in Fig. 1.

Referring to Fig. 1 of the drawing, a direct current main motor M, the operation of which is to be controlled, has its armature M' connected in a closed circuit with the armature G' of a direct current generator G. A pair of supply conductors L1 and L2 are provided for supplying the direct current used in the control system. The supply conductors L1 and L2 are connected to the terminals of an exciter E, mounted on the shaft of the generator G. The exciter E and generator G are driven at substantially constant speed by any suitable driving means DM. The separately excited field winding Gf of the generator G is arranged to be connected to the supply conductors L1 and L2 in series with a plurality of resistors $r2$, $r4$, $r5$ and $r6$, by either of a pair of reversing switches 1 and 2. Each of the reversing switches 1 and 2 carries a set of auxiliary contact members 1a and 2a, respectively, for connecting the operating coil of a line switch 3 to supply conductors L1 and L2 when either reversing switch 1 or 2 is closed. The contact members of the line switch 3 are arranged to connect the armature 12' of an auxiliary motor 12 to supply conductors L1 and L2 in series with a resistor R and a regulating resistor $r1$. The regulating resistor $r1$ is controlled by the contact members of a regulator 7, of any suitable type, for maintaining the current in the armature circuit of the auxiliary motor 12 at a limited or constant value during acceleration of motor 12.

A plurality of accelerating relays 4, 5 and 6 are arranged to short circuit adjustable sections of resistor R in the armature circuit of auxiliary motor 12 and at the same time short circuit resistors $r4$, $r5$ and $r6$ in the circuit of the generator field winding Gf.

The reversing switches 1 and 2 and accelerating relays 4, 5 and 6 are controlled from contact members of a manual controller 9 in any well known manner so that either reversing switch and all of the accelerating relays may be successively closed to bring the main motor up to full speed in either direction.

The field winding Mf of the main motor M is connected to supply conductors L1 and L2 to be energized therefrom at all times.

The field winding 12f of the auxiliary motor 12 is connected to contact members of the reversing switches 1 and 2 to be energized and reversed simultaneously with the main generator field winding Gf.

A telemotor transmitter 11 of any suitable type is driven by the main motor M and is connected to a telemotor receiver 10, the arrangement being such that the telemotor receiver 10 rotates at all times at a speed proportional to the speed of the main motor M. The telemotor receiver 10 and transmitter 11 are arranged to be energized from a suitable source S2. A switch K2 is provided for connecting the telemotor transmitter and receiver to the source S2.

The auxiliary motor 12 carries a fly-wheel Fw and an adjustable friction brake Fb, the arrangement being such that, by adjusting the friction brake Fb, the acceleration period of the auxiliary motor 12 may be adjusted between suitable limits, for example 1½ seconds and 4 seconds.

The auxiliary motor 12 and telemotor receiver 10 are each connected to a side of a differential switch 8, the directions of rotation and speeds of the auxiliary motor 12 and telemotor receiver 10 being such that when the main motor M is running at full speed in a particular direction and the auxiliary motor 12 is running at full speed in a corresponding direction, the movable contact member of the differential switch 8 is stationary. Suitable gearing may be interposed in any part of the system to accomplish this result if necessary.

The differential switch which I prefer to use in the practice of my invention comprises a helical gear $8g$ fastened on the shaft of auxiliary motor 12 and an internally threaded drum $8b$, mounted on the helical gear in such manner that the threads of the gear and drum engage but the drum may move axially along the gear upon assuming a different angular relation with respect to the gear. The drum $8b$ is driven by the telemotor receiver 10 by means of a slot and pin connection. A cylindrical yoke $8c$ is fastened to the shaft of telemotor receiver 10 and carries a pair of pins $8h$ which extend through slots (not shown) in the drum $8b$. The cylindrical yoke $8c$ may also serve as a bearing for the shaft of auxiliary motor 12. A contact arm $8a$, pivoted at an intermediate point to a stationary pin, is arranged with one end in a groove in the periphery of the drum $8b$. The free end of the contact arm $8a$ carries a movable contact member $8d$, arranged to engage a stationary contact member $8f$ in one position and a stationary contact member $8e$ in another position. The space between the stationary contact members $8e$ and $8f$ is sufficient to permit the movable contact member $8d$ to assume a neutral position in which neither stationary contact member is engaged. The contact members $8d$, $8e$ and $8f$ are so connected in the external circuit that when movable contact member $8d$ engages stationary contact member $8f$, a resistor $r2$, in series with the generator field winding Gf is short-circuited, thereby increasing the excitation of generator G and the speed of motor M, and when movable contact member $8d$ engages stationary contact member $8e$ a resistor $r1$ is connected in shunt to the generator field winding Gf, thereby reducing the excitation of generator G and the speed of motor M. A condenser $c2$ is connected between the contact members $8d$ and $8f$ to reduce sparking at the contact members and a similar condenser $c1$ for a similar purpose is connected between contact members $8d$ and $8e$.

The resistance values of the resistors $r1$ and $r2$ is so related to the inductance of the generator field winding Gf and the voltage of exciter E that the generator excitation may be varied rapidly by the differential switch 8 at any point in the working range.

Fig. 2 shows a form of differentially operated rheostat which I may substitute for the differential switch 8 and resistors r1 and r2 of the system shown in Fig. 1. Referring to Fig. 2, an internally threaded drum 8b' is mounted on a helical gear 8g' in such manner that the threads of the gear and drum engage but the drum may move axially along the gear upon assuming a different angular relation with respect to the gear. The drum 8b' is driven by a slot and pin connection from a cylindrical yoke 8c'. The yoke 8c' carries pins 8h' which extend through slots (not shown) in the drum 8b'. A contact arm 8a' is pivoted at an intermediate point to a stationary pin 8p. One end of the contact arm engages a groove in the periphery of the drum 8b'. The free end of the contact arm 8a' is arranged to compress either of two carbon pile resistors r2' or r1', with varying degrees of pressure depending upon the angular position of the contact arm 8a'. The variation of pressure on the carbon pile resistors causes variations in resistance of the resistors as is well known, the resistance decreasing with increase of pressure. Centering springs 8s are provided for the contact arm 8a'.

The operation of the above-described apparatus may be set forth as follows: Switch K2 (Fig. 1) is closed preparatory to operation of the apparatus. Upon closure of switch K2 the telemotor transmitter 11 and receiver 10 are connected to source S2, thereby energizing the telemotor elements so that thereafter rotation of the telemotor transmitter 11 will result in proportionate rotation of the telemotor receiver 10.

Assuming that the generator driving means DM is in operation, the generator G is in motion but generates no voltage as its field winding Gf is disconnected. The armature circuit and the field circuit of auxiliary motor 12 are open. The main motor M, telemotor transmitter 11, telemotor receiver 10 and auxiliary motor 12 are, therefore, all at rest.

If the handle of manual controller 9 is moved to the left to the first operating point, contact segment 9s of the manual controller bridges contact members 9a and 9b, completing a circuit for the operating coil of reversing switch 1. This circuit extends from supply conductor L1 through contact members 9a, 9s and 9b of the manual controller 9, the operating coil of reversing switch 1, thence to supply conductor L2. Reversing switch 1 closes, connecting the field winding 12f of the motor 12 and a circuit comprising the field winding Gf of generator G and resistors r4, r5, r6 and r2 to supply conductors L1 and L2 by closure of its contact members 1a and 1b, and connecting the operating coil of relay 3 to supply conductors L1 and L2 by closure of its contact members 1c. The circuit of the field winding 12f of auxiliary motor 12 extends from supply conductor L1 through contact members 1b of reversing switch 1, the field winding 12f, contact members 1a of reversing switch 1, thence to supply conductor L2. The circuit of the generator field winding Gf extends from supply conductor L1 through contact members 1b of reversing switch 1, resistors r4, r5 and r6, the generator field winding Gf, through the resistor r2 and contact members 1a of reversing switch 1 to supply conductor L2. The circuit for the operating coil of relay 3 extends from supply conductor L1 through contact members 1c of reversing switch 1, conductor 13, the operating coil of relay 3 to supply conductor L2.

Relay 3 closes, connecting the armature 12' of auxiliary motor 12 to supply conductors L1 and L2 in series with resistor R.

The generator G now generates a voltage and the main motor M begins to turn. At the same time the auxiliary motor 12 begins to turn against the retarding force of friction brake Fb. The acceleration of auxiliary motor 12 is held to a substantially uniform value by the action of regulator 7 which opens its contact members inserting the regulating resistor r7 in series with the armature 12' of auxiliary motor 12 whenever the current drawn by the auxiliary motor exceeds a predetermined value. As the motor M rotates, it turns the telemotor transmitter 11 which in turn causes a corresponding rotation of the telemotor receiver 10. If the telemotor receiver 10 lags behind the auxiliary motor 12, the drum 8b moves to the right, causing the movable contact member 8d to engage the stationary contact member 8f, thereby short-circuiting the resistor r2 and increasing the excitation of generator G and the speed of main motor M. If the telemotor receiver 10 advances relatively to the auxiliary motor 12, the drum 8b moves to the left, causing movable contact member 8d to engage stationary contact member 8e, thereby connecting resistor r1 in shunt to the generator field Gf, reducing the generator excitation and the speed of main motor M. The speed of the main motor M is thus held proportional to the speed of the auxiliary motor 12, during acceleration and also after the speed of auxiliary motor 12 reaches a constant value. The speed of auxiliary motor 12 reaches a constant low value when its torque, limited by resistor R falls to a value equal to the retarding torque of the friction brake Fb.

If the handle of manual controller 9 is moved to the left to the next operating point, contact segment 9s of the manual controller bridges contact members 9a and 9c, thereby completing a circuit for the operating coil of accelerating relay 4. This circuit extends from supply conductor L1 through contact members 9a, 9s and 9c of the manual controller, the operating coil of relay 4, thence to supply conductor L2. Accelerating relay 4 closes, short circuiting resistor r4 in the circuit of the generator field winding Gf by closure of its contact members 4a and short circuiting a section of resistor R by closure of its contact members 4b.

The auxiliary motor 12 now accelerates to a higher speed, its acceleration being limited by the action of regulator 7 and the speed of the main motor M being held at all times proportional to the speed of auxiliary motor by the action of the differential switch 8.

If the handle of manual controller 9 is moved further to the left to the next operating point, contact segment 9s of the manual controller bridges contact members 9a and 9d, completing a circuit for the operating coil of accelerating relay 5. This circuit may be traced from supply conductor L1 through the contact members 9a, 9s and 9d of manual controller 9, the operating coil of relay 5, thence to supply conductor L2. Relay 5 closes, short circuiting resistor r5 in the circuit of the generator field winding Gf by closure of its contact members 5a and short circuiting a section of resistor R by closure of its contact members 5b.

The auxiliary motor 12 now accelerates to a higher speed in the manner previously described, the speed of main motor M remaining at all times proportional to the speed of the auxiliary motor.

If the handle of manual controller 9 is moved further to the left to the last operating point, contact segment 9s of the manual controller bridges contact members 9a and 9e, thereby completing a circuit for the operating coil of accelerating relay 6. This circuit extends from supply conductor L1 through contact members 9a, 9s and 9e of the manual controller 9, the operating coil of accelerating relay 6, thence to supply conductor L2. Accelerating relay 6 closes, short circuiting resistor r6 in the circuit of the generator field winding Gf by closure of its contact members 6a and short circuiting a section of resistor R by closure of its contact members 6b.

The auxiliary motor 12 now accelerates to its maximum speed, the speed of the main motor remaining proportional to the speed of the auxiliary motor during acceleration and also after the speed of auxiliary motor 12 reaches a constant value.

If the load on the main motor M changes, the differential switch 8 acts to change the excitation of generator G in such a direction and by such an amount as is necessary to maintain the speed of motor M constant. Similarly, if the resistance of the common circuit of the generator and motor armatures changes for any reason, such as variation of brush pressure or heating of the armatures, the arrangement automatically corrects for the change of resistance to maintain the motor speed constant.

If the manual controller 9 is now returned to neutral position, the steps described above for acceleration are followed in reverse sequence, the motor M being decelerated smoothly under control of auxiliary motor 12.

If the handle of manual controller 9 is moved to the right, reversing switch 2 closes, energizing the generator field winding Gf and the field winding 12f of auxiliary motor 12 in the reverse direction. The main motor M and the auxiliary motor 12 now rotate in the reverse direction. The operation is otherwise identical with that described above for forward operation.

The main motor M may obviously be operated continuously at any of a plurality of speeds below high speed by arresting the manual controller at a corresponding operating position.

By adjusting the proportion of resistor R controlled by the accelerating relays 4, 5 and 6, the operating speeds of the main motor M may be fixed at any desired value within a considerable range, and by adjusting the friction brake Fb, the rate of acceleration of the main motor M may be adjusted to suit requirements.

In my copending application Serial No. 428,647, filed February 15, 1930, patented March 8, 1932, No. 1,848,873, I have disclosed a motor-control system of the variable voltage type, in which the excitation of the generator supplying the work motor is controlled by a regulator responsive to the differences of voltages of an auxiliary generator driven at variable speed and a second auxiliary generator driven by the work motor, in such manner as to eliminate the effect of load upon the speed of the work motor.

In my copending application Serial No. 428,650, filed February 15, 1930, patented April 25, 1933, No. 1,905,275, I have disclosed a variable voltage motor-control system, in which the excitation of the generator supplying the work motor is controlled in accordance with the difference of voltages of a potentiometer controlled by a series of time element relays and an auxiliary generator driven by the work motor, in such manner as to eliminate the effect of load upon the speed of the work motor.

In my copending application Serial No. 445,303, filed April 18, 1930, patented October 18, 1932, No. 1,882,787, I have disclosed a variable voltage motor-control system, in which the excitation of the generator supplying the work motor is controlled in accordance with the difference between the counter-electromotive force of the work motor and the voltage of an auxiliary generator driven at constant speed, in such a manner as to eliminate the effect of load upon the speed of the work motor.

In my copending application Serial No. 445,304, filed April 18, 1930, patented October 10, 1932, No. 1,882,788, I have disclosed a variable voltage motor-control system, in which the excitation of the generator supplying the work motor is controlled in accordance with the counter-electromotive force of the work motor, as measured by the terminal voltage of the generator corrected for the armature resistance drop, in such a manner as to eliminate the effect of load upon the speed of the work motor.

In my copending application Serial No. 471,684, filed July 30, 1930, patented October 18, 1932, No. 1,882,789, (W. E. Case 15,301), I have disclosed an elevator system, in which the speed regulation of the elevator motor is corrected by means of a compounding arrangement and the rate of deceleration of the elevator motor is controlled by time element means, and in which a load responsive device is provided for operating upon the time element means to obtain uniform deceleration under all load conditions.

In my copending application Serial No. 547,389, filed June 27, 1931, patented October 25, 1932, No. 1,883,886, (W. E. Case 16,025), I have disclosed a variable voltage motor-control system, in which the excitation of the generator supplying the work motor is controlled in accordance with the difference between the counter-electromotive force of the work motor and the voltage of an auxiliary generator driven at variable speed, in such a manner as to eliminate the effect of load upon the speed of the work motor.

In the present application, I do not claim the control of the generator excitation broadly in accordance with a voltage proportional to the difference between the actual speed of the motor and a predetermined control speed, as this is the subject matter of my application Serial No. 428,647, filed February 15, 1930, mentioned above.

I do not claim the control of the generator excitation to cause the speed of the work motor to follow a predetermined succession of values, each independent of load, nor the control of the generator excitation in accordance with a control voltage furnished by the specific means of a potentiometer, nor the control of a field forcing resistor broadly in accordance with the speed of the work motor, as this subject matter is covered in my copending application Serial No. 428,650, filed February 15, 1930, mentioned above.

In the present application, I do not claim the control of the generator excitation by means responsive to a control voltage, the terminal voltage of the motor, and a voltage proportional to the motor armature current, nor by means responsive to a control voltage and a voltage substantially equal to the counter-electromotive force of the work motor, as this subject matter is covered in my copending application Serial No. 445,303, filed April 18, 1930, mentioned above.

I do not claim the control of the generator excitation broadly by means responsive to the terminal voltage of the motor and a voltage proportional to the motor armature current, nor broadly by means responsive to a voltage substantially equal to the motor counter-electromotive force, as this subject matter is claimed in my copending application Serial No. 445,304, filed April 18, 1930, mentioned above.

In the present application, I do not claim the control of the rate of change of speed of an elevator motor by means including a load responsive element for correcting the motor speed regulation, means for determining the rate of change of speed of the elevator motor, and additional load responsive means for operating upon the last mentioned means to cause the rate of change of speed of the elevator motor to be the same under all load conditions, as this subject matter is claimed in my copending application Serial No. 471,684, filed July 30, 1930, mentioned above.

I do not claim the control of the generator excitation by means responsive to the counter-electromotive force of the motor and a voltage furnished by the specific means of a control generator driven at variable speed, nor to the control of the generator excitation by means involving an auxiliary machine decelerated by the specific means of an electro-magnetic brake, as this subject matter is claimed in my copending application Serial No. 547,389, mentioned above.

In the copending application of Henry D. James, Serial No. 498,423, filed November 26, 1930, patented October 24, 1933, No. 1,932,073, and assigned to the Westinghouse Electric and Manufacturing Company, there is disclosed a motor-control system of the variable-voltage type, in which a differential device responsive to differential rotation of the main motor and of an auxiliary motor is used to control the generator excitation in such manner as to eliminate the effect of load upon the speed of the main motor. In the aforesaid application of Henry D. James, the speed of the auxiliary motor is varied by varying the voltage applied to its armature, and high speed operation of the main motor is obtained by simultaneously reducing the excitation of the main motor and the auxiliary motor.

In the present application I do not claim the control of the speed of the auxiliary motor by the specific means of variable voltage apparatus, nor the control of the main motor speed by simultaneously varying the excitation of the main motor and of the auxiliary motor, as this subject-matter is the invention of Henry D. James and is claimed in his copending application mentioned above.

I do not wish to be restricted to the specific structural details, arrangement of parts or circuit connections herein set forth, as various modifications thereof may be effected without departing from the spirit and scope of my invention. I desire, therefore, that only such limitations shall be imposed as are indicated in the appended claims.

I claim as my invention:

1. In a motor control system, a motor, a generator, means for driving said generator, electrical connections between the armatures of said motor and said generator, a rotating element, means for accelerating and decelerating said rotating element, means for adjusting the rate of change of speed of said rotating element, a second rotating element, means for driving said second rotating element at a speed proportional to the speed of said motor, and means responsive to the ratio of the speeds of said rotating elements for controlling the excitation of said generator to maintain said ratio at a predetermined value.

2. In a motor control system, a motor, a generator, means for driving said generator, electrical connections between the armatures of said motor and said generator, means for adjusting the excitation of said generator in accordance with predetermined values of motor speed, a rotating element, means for accelerating and decelerating said rotating element, means for adjusting the rate of change of speed of said rotating element, a second rotating element, means for driving said second rotating element at a speed proportional to the speed of said motor, and means responsive to the ratio of the speeds of said rotating elements for controlling the speed of said motor to maintain said ratio at a predetermined value.

3. In a motor control system, a main motor, a generator, means for driving said generator, electrical connections between the armatures of said main motor and said generator, an auxiliary motor, means for controlling the speed of said motor, means for controlling the rate of change of speed of said auxiliary motor, a rotating element, means for driving said rotating element at a speed proportional to the speed of said auxiliary motor, a second rotating element, means for driving said second rotating element at a speed proportional to the speed of said main motor, and means responsive to the ratio of the speeds of said rotating elements for controlling the excitation of said generator to maintain said ratio at a predetermined value.

4. In a motor-control system, a main motor, a generator, electrical conductors completing a circuit including the armatures of said motor and said generator, a rotating element, an auxiliary motor for driving said element, a braking device for said auxiliary motor, means including said braking device for varying the speed of said auxiliary motor, a second rotating element, means for driving said second element at a speed proportional to the speed of said main motor, and means responsive to differential rotation of said rotating elements for controlling the excitation of said generator to maintain a predetermined ratio between the speeds of said main motor and said auxiliary motor.

5. In a motor-control system, a main motor, a generator, electrical conductors completing a circuit including the armatures of said motor and said generator, a rotating element, an auxiliary motor for driving said element, a current responsive regulating device for controlling the armature current of said auxiliary motor to thereby control its rate of change of speed, a second rotating element, means for driving said second element at a speed proportional to the speed of said main motor, and means responsive to differential rotation of said rotating elements for controlling the excitation of said generator to maintain a predetermined ratio between the speeds of said main motor and said auxiliary motor.

WILLIAM F. EAMES.